US008559412B1

(12) United States Patent
Nicholls et al.

(10) Patent No.: US 8,559,412 B1
(45) Date of Patent: Oct. 15, 2013

(54) COMMUNICATION TIME INFORMATION IN A NETWORK TO ENABLE SYNCHRONIZATION

(75) Inventors: Charles W. T. Nicholls, Nepean (CA); Michel Ouellette, Orleans (CA)

(73) Assignee: Rockstar Consortium US LP, Plano, TX (US)

( * ) Notice: Subject to any disclaimer, the term of this patent is extended or adjusted under 35 U.S.C. 154(b) by 1292 days.

(21) Appl. No.: 12/006,151

(22) Filed: Dec. 31, 2007

(51) Int. Cl.
*H03D 3/24* (2006.01)

(52) U.S. Cl.
USPC .......................................................... 370/350

(58) Field of Classification Search
USPC .......................................................... 370/350
See application file for complete search history.

(56) References Cited

U.S. PATENT DOCUMENTS

| 5,566,180 | A | 10/1996 | Eidson et al. |
| 6,252,445 | B1 | 6/2001 | Eidson |
| 6,278,710 | B1 | 8/2001 | Eidson |
| 6,370,159 | B1 | 4/2002 | Eidson |
| 6,493,539 | B1 | 12/2002 | Falco et al. |
| 6,512,990 | B1 | 1/2003 | Woods et al. |
| 6,731,622 | B1 * | 5/2004 | Frank et al. ................... 370/342 |
| 7,447,237 | B2 * | 11/2008 | Koshino et al. ............... 370/503 |
| 2004/0114539 | A1 * | 6/2004 | Beshai et al. ................. 370/254 |
| 2007/0081514 | A1 * | 4/2007 | Shirokura et al. ............ 370/350 |
| 2007/0223537 | A1 * | 9/2007 | Crowle et al. ................. 370/503 |

OTHER PUBLICATIONS

G.G. Algie et al., U.S. Appl. No. 10/748,392, "Providing a Timing Source for Multiple Nodes Coupled to a Circuit-Switched Network," filed Dec. 30, 2003, pp. 1-19, Figs. 1-3.
The International Engineering Consortium, "Tektronix: Synchronous Optical Network Tutorial," http://www.webproforum.com, pp. 1-58 (1997).

* cited by examiner

*Primary Examiner* — Sulaiman Nooristany
(74) *Attorney, Agent, or Firm* — Saul Ewing LLP (57) ABSTRACT

A first node in a network receives a timing packet containing time information, where the timing packet is originated by a time server. The first node then updates the time information in the timing packet to reflect a delay associated with communicating the timing packet over a network link. The first node then updates the time information in the timing packet to reflect the delay associated transfer of the timing packet through the node. The first node sends the timing packet with the updated time information to a second node to enable the second node to use the updated time information for synchronization of the second node. The process repeats across an arbitrary number of nodes to enable time alignment between the first node and final destination node.

16 Claims, 5 Drawing Sheets

COMMUNICATION TIME INFORMATION IN A NETWORK TO ENABLE SYNCHRONIZATION

TECHNICAL FIELD

The invention relates generally to communicating time information across nodes in a network to enable synchronization of one or more of the nodes.

BACKGROUND

In certain applications, nodes within a network have to be time-synchronized. One example of such an application involves a wireless or mobile communications network, such as a CDMA (code division multiple access) 2000 and WiMAX (World Interoperability for Microwave Access), that has nodes such as base stations that are time synchronized to enable high-speed communications with mobile stations. Typically, due to strict requirements of accurate time references by the wireless standards, nodes within a mobile communications network have used global position system (GPS) receivers to maintain time synchronization. However, GPS receivers or other high accuracy time reference sources provided in each node add to the hardware and installation cost of network equipment, which increases the overall cost associated with deploying the wireless communications network.

SUMMARY

In general, according to an embodiment, to enable synchronization of at least one node in a network, timing packet(s) containing time information can be communicated among two or more nodes of the network. A particular node can receive a timing packet containing time information, and the particular node can update the time information in the received timing packet to reflect a delay associated with communication of the timing packet. The timing packet containing the updated time information can be sent to a second network node to allow for synchronization of the second network node.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a mechanism is provided in a network of nodes to enable nodes to communicate timing packets containing time information such that at least some of the nodes can be synchronized. Synchronizing a node refers to clock synchronizing the node and/or time synchronizing the node. Clock synchronization refers to synchronizing a clock (as produced by a clock generator oscillator) in a node with respect to a reference or master clock. Time synchronization refers to synchronizing the time in the node with respect to a reference time.

In accordance with some embodiments, clock synchronization and/or time synchronization can be performed without the use of relatively expensive time reference devices, such as global positioning system (GPS) receivers, in each of the nodes of the network. The clock synchronization and/or time synchronization is based on communication of timing packets across nodes, where the timing packets contain time information that is updated to reflect various delays as the timing packets traverse through the nodes. Techniques according to some embodiments allow for relatively low cost (and low accuracy) clock devices to be used in the nodes while still being able to achieve accurate time and/or clock synchronization. As used here, a "clock device" refers to a device that produces a periodically oscillating signal (a "clock" or "clock signal") having a frequency.

In some embodiments, each particular node is able to interact with its neighbor node(s) to determine inter-node delay(s) over network link(s) between the particular node and its neighbor node(s). Also, each node is able to measure the transport delay through the node. Such network nodes are referred to as "cognitive nodes" in that such nodes are aware of the network delay environment (including network link delays and node delays) in which the nodes are deployed. The nodes are able to learn about the network delay environment based on characterizations performed by the nodes. The characterizations can be performed periodically, or on an as-needed basis. As described further below, the characterizations can be accomplished by exchanges of timing packets among nodes.

In some embodiments, the inter-node delays being characterized are single-hop delays. A "single-hop delay" refers to the delay (over a network link) between two nodes with no intervening nodes in between. Since the inter-node delays being characterized are single-hop delays, such single-hop delays will not vary significantly with time and are generally not traffic dependent. A single-hop inter-node delay is generally relatively small (in other words, has a relatively short time duration). The relatively short time duration allows for the use of low stability clock devices in the nodes for performing relatively accurate synchronization, since the shortness of the inter-node delay means that there will be relatively small drift (in frequency) in the node clock devices during the time duration. The delay through the node is also relatively short such that node delay can also be accurately characterized using low stability clock devices. The ability to perform synchronization of nodes using low stability (and low cost) clock devices in the nodes means that lower cost nodes can be provided, which can reduce overall system cost.

For example, the frequency accuracy of the node clock device may be as poor as 100 ppm (parts per million); consequently, measurement of a 1 ms (millisecond) delay may introduce up to 100 ns (nanoseconds) time error that represents a worst case scenario, since typically inter-node delay time may be in the order of 0.1 ms resulting in just 10 ns time measurement error, or the frequency accuracy of the node clock device may be well under 100 ppm like 10 ppm resulting also in just 10 ns time measurement error. Provision of frequency synchronization to a primary reference clock (typically 10 parts-per-trillion frequency accuracy), such as in the case of Synchronous Ethernet removes the delay characterization error associated with the node clock frequency accuracy.

In some embodiments, a delay table is maintained in each particular node, where the delay table specifies the inter-node delays between the particular node and its neighbor(s). The delay table can be periodically or intermittently updated based on changing conditions (e.g., such as changes in the surrounding temperature or other environment conditions).

The nodes of the network can be considered clients of a time server that has a high-accuracy time reference source. The high-accuracy time reference source of the time server can be any of the following: a source based on global positioning system (GPS), a rubidium time clock source, a cesium time clock source, and so forth. In general, the time reference source associated with the time server is of relatively high quality and accuracy. The network nodes, as clients of the time server, are able to issue requests to the time server for timing packets. In response to such requests, the time server transmits timing packets to the requesting nodes, such that the nodes can perform synchronization. As the timing packet traverses nodes along a path through the network, each of the nodes through which the timing packet traverses updates the time information contained in the timing packet to reflect network link delays (inter-node delays), as well as delays associated with traversal of a timing packet through each of the nodes in the path. In this manner, at least some of the nodes can synchronize themselves in response to the timing packets. Such nodes are considered to be self-configuring. Moreover, the nodes are able to automatically reconfigure in the event of network change, such as when network nodes are added or removed.

Using a high-accuracy time reference source in the time server, rather than in each of the network nodes, allows for reduced system cost. Although just one time server is mentioned, it is noted that plural time servers can be used, such as plural time servers for plural corresponding groups of network nodes.

Figure 1:
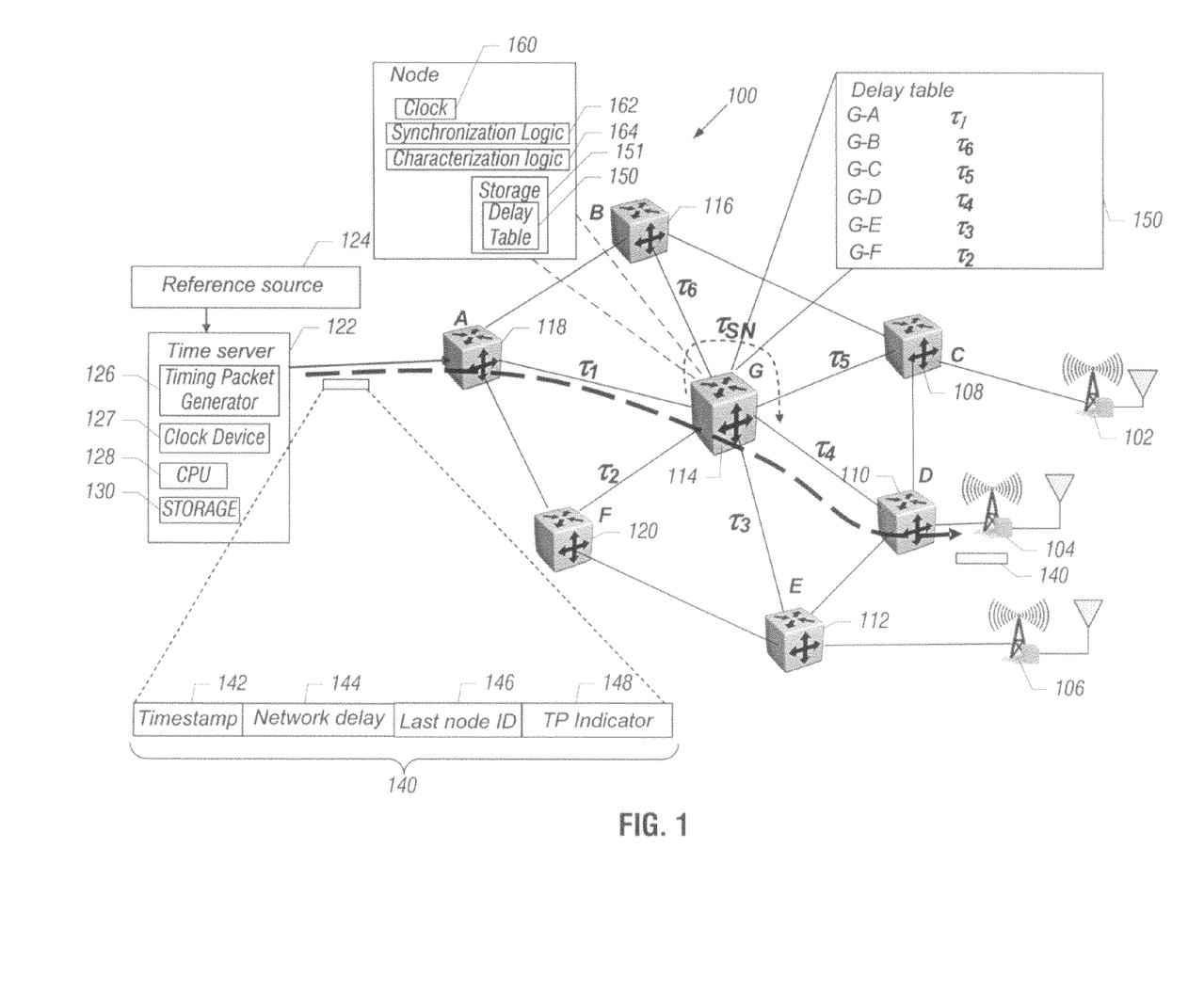
FIG. 1 is a block diagram of an example network of nodes and a time server that is able to transmit timing packets to one or more of the nodes, in accordance with an embodiment.

FIG. 1 shows an example mobile or wireless communications system 100 that includes a number of nodes. Some of the nodes are base stations, such as base stations 102, 104, and 106. Each base station 102, 104, and 106 is able to communicate over wireless links with mobile stations. The base stations 102, 104, 106 are connected to respective base station controllers (or radio network controllers), not depicted in FIG. 1, through a packet network including the switch nodes 108-120. Other nodes in the mobile communications system 100 can be other types of nodes, such as packet data serving nodes (PDSNs), serving GPRS (General Packet Radio Service) support nodes, gateway GPRS support nodes, and so forth.

As further depicted in FIG. 1, the mobile communications system 100 also includes a time server 122 that is able to communicate with the other nodes of the system 100. In different implementations, the time server 122 can be considered to be outside the system 100. Also, alternatively, there can be multiple time servers in the system 100.

The time server 122 and network nodes 102, 104, 106, 108, 110, 112, 114, 120, 116, 118, and 120 can be interconnected by an asynchronous packet-switched network, such as an asynchronous Ethernet network, or other type of network. Since the underlying network is asynchronous, a synchronization mechanism or technique that provides timing packets can be used to allow for network nodes to be synchronized with each other. In other embodiments, a Synchronous Ethernet network, which provides physical layer frequency distribution, may be used.

Although reference has been made to a mobile communications system, it is contemplated that techniques according to some embodiments can also be applied to other types of systems.

The time server 122 is associated with, or includes, a primary time reference source 124 and a timing packet generator 126 for generating timing packets. The primary time reference source 124 provides a relatively high accuracy reference time that can be inserted into timing packets to be sent by the time server 122. The timing packet generator 126 can send timing packets in response to requests from clients (any of the network nodes in the system 100), or the timing packet generator 126 can send timing packets upon detection of one or more events. The timing packet generator 126 can be implemented in hardware, or alternatively, the timing packet generator 126 can be implemented with software that is executable on one or more central processing units (CPUs) 128 in the time server 122. The CPU(s) is (are) connected to a storage device 130 in the time server 122. The time server 122 also includes a primary or master clock device 127 that is synchronized with respect to the primary time reference source 124.

FIG. 1 illustrates an example timing packet 140 that can be transmitted by the time server 122. Note that the timing packet 140 illustrated in FIG. 1 is merely an example timing packet, as other timing packets can have other formats. The timing packet 140 includes a timestamp field 142 for storing an initial timestamp (corresponding to the time of the primary reference source 124 at the time point that the timing packet 140 is transmitted by the time server 122). The timing packet 140 also includes an end-to-end (E-E) timing packet (TP) indicator field 148 to indicate that the packet 140 is a timing packet (as opposed to other types of packets that can be communicated in the network 100). The TP indicator field 148 can also include a sequence number to allow for a particular client to determine a sequence of plural timing packets if plural timing packets are transmitted by the time server 122 to the particular client.

The timing packet 140 also includes a network delay field 144 that is updated by nodes that the timing packet 140 has traversed through. Note that the timestamp field 142 in combination with network delay field 144 can be considered an example of "time information" in the timing packet that is updated. Alternatively, instead of providing a separate timestamp field 142 and network delay field 144, one field can be provided instead, with the one field updated to reflect cumulative delays as the timing packet traverses network links and nodes.

The network delay field 144 is updated to reflect inter-node delays and delays through the nodes. Basically, as the timing packet 140 traverses through each particular node, the network delay value contained in the network delay field 144 is updated (by summing the existing network delay field 144 value with additional delay values, for example) to include the corresponding inter-node delay (from the upstream node to the particular node) and the delay through the particular node. The timing packet 140 also includes a last node ID field 146 that contains the identifier of the last node through which the timing packet 140 traversed. The last node ID field 146 is updated by each node that the timing packet passes through.

As depicted in the example FIG. 1, some of the various nodes are also labeled as nodes A, B, C, D, E, F, G. An example delay table 150 is depicted for node G (node 114). The delay table can be stored in a storage device 151 of the node 114.

The delay table (or other type of data structure) 150 includes six entries to represent the six inter-node delays between node G and its six neighbors. The inter-node delay between node A and node G (G-A) is τ1, the inter-node delay between node B and node G (G-B) is τ6, and so forth. The delay through node G is represented as $\tau_{SN}$. Note that a respective delay table can be implemented in each of the nodes 102, 104, 106, 108, 110, 112, 114, 116, 118, and 120.

In the example of FIG. 1, the network node 114 also includes a clock device 160 (also referred to as a "client clock device" or "local clock device") that produces the oscillating clock for the node 114. Also, the node 114 includes synchronization logic 162 (to perform synchronization based on timing packets) and characterization logic 164 (to characterize inter-node delays). The synchronization logic 162 is also able to update time information in timing packets to reflect network link delays and node delays as such timing packets pass through the node 114. The synchronization logic 162 and characterization logic 164 can be implemented in hardware (e.g., microcontrollers, microprocessors, etc.) or in software executable on CPU(s). Updating of time information in a timing packet can be performed by the synchronization logic 162 implemented in hardware (layer 1) to enable for quicker response and more accurate time information updates.

The clock device 160, synchronization logic 162, and characterization logic 164 can also be provided in the other nodes of FIG. 1.

Figure 2:
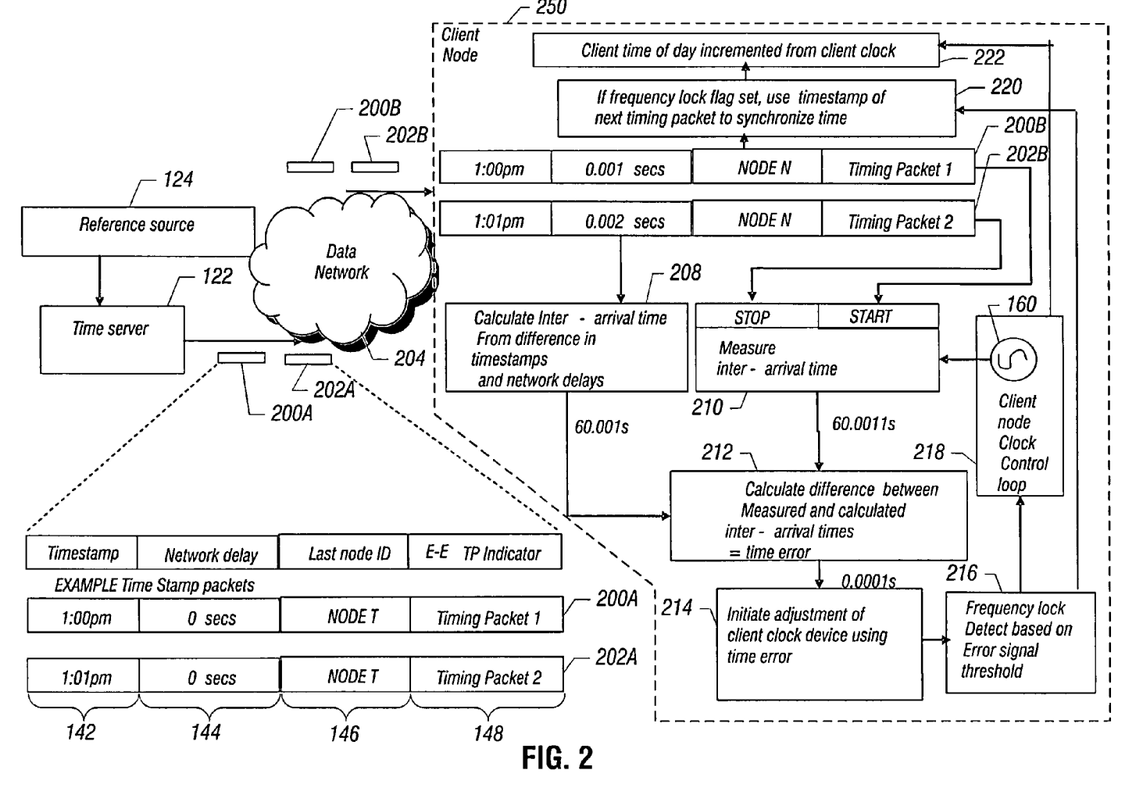
FIG. 2 illustrates an example flow of a process to perform time synchronization and clock synchronization of a client node within a network, in accordance with an embodiment.

An example flow of synchronizing a client node 250 according to received timing packets is depicted in FIG. 2. In the example of FIG. 2, two timing packets 200A and 202A are depicted as being transmitted by the time server 122 through a data network 204 (e.g., Ethernet network). The timing packet 200A is the first timing packet transmitted by the time server 122, and the timing packet 202A is the second packet transmitted by the time server 122 after the first timing packet 200A. Although not shown, additional one or more timing packets can be transmitted after timing packet 202B. The first timing packet 200A is also referred to as a start timing packet, and the second timing packet 202A is referred to as a stop timing packet. The pair of timing packets 200A, 202A are used to perform clock synchronization of the clock device 160 in a client node 250 (which can be one of the base stations 102, 104, 106 of FIG. 1 or some other node, for example). Performing clock synchronization is accomplished by locking the frequency of the clock device 160 based on the start and stop timing packets 200A, 202A or can be done through physical-layer techniques like Synchronous Ethernet.

As transmitted by the time server 122, the timestamp field 142 of each of timing packets 200A, 202A contains the corresponding timestamp representing the time at which the respective timing packet was transmitted by the time server 122. Thus, for example, the timestamp field 142 for the start timing packet 200A is 1:00 pm, and the timestamp field 142 for the stop timing packet 202A is 1:01 pm (sent one minute later).

The network delay field 144 for each of timing packets 200A, 202A has the value zero since the timing packets have just been transmitted by the time server 122 and thus have not experienced network delays. The last node ID field 146 for each of timing packets 200A, 202A indicates "node T," which represents the time server 122. The timing packet indicator field 148 of each of the timing packets 200A, 202A contains a respective sequence number to indicate the sequence of the timing packets 200A, 202A. For example, the timing packet indicator field 148 of the timing packet 200A has sequence number 1, whereas the timing packet indicator field 148 of the stop timing packet 202A has sequence number 2.

After traversing through various nodes of the data network 204, the timing packets become timing packets 200B, 202B, whose contents have been updated. The timestamp fields 142 of the timing packets 200B, 202B remain unchanged, as they represent the original transmit time of the time server 122. However, the network delay fields 144 of the timing packets 200B, 202B have been updated to reflect the cumulative delays experienced by respective timing packets 200B, 202B as such timing packets traversed through nodes of the data network 204. In the example of FIG. 2, after traversal through the data network 204, the network delay field 144 of the start timing packet 200B has been updated to reflect a network delay of 0.001 seconds, whereas the network delay field 144 of the stop timing packet 202B has been updated to reflect a network delay of 0.002 seconds. Note that the timing packets 200B, 202B have experienced different delays through the data network 204, which can result from the timing packets traversing through different network paths, and/or experiencing different queuing delays in the nodes of the data network 204. The last node ID fields 146 of the timing packets 200B, 202B have also been updated to reflect the identifier of the last node, which in this example is "node N."

The timing packets 200B, 202B are received by the client node 250. From the timing packets 200B, 202B, the inter-arrival time delay can be calculated (at 208) by the client node 250 from the difference in the timestamp values and the network delay values of the timestamp fields 142 and network delay fields 144, respectively. Effectively, the inter-arrival delay of the timing packets 200B, 202B is calculated by first summing the timestamp value and the network delay value of the start timing packet 200B to produce a first time value, and by summing the timestamp value and network delay value of the stop timing packet 202B to produce a second time value. Then, the difference between the second time value and the first time value is calculated to produce the inter-arrival delay. The calculated inter-arrival delay represents the actual delay based on when the timing packets 200B, 202B were originally transmitted by the time server 122 and the delays experienced by the timing packets 200B, 202B as they traversed through the data network 204.

This calculated inter-arrival delay is to be compared to a measured inter-arrival time, as measured (at 210) by the client node 250. The measured delay is based on identifying the start time upon receipt of the start timing packet 200B by the client node 250, and identifying the stop time upon receipt of the stop timing packet 202B by the client node 250. The difference between the start and stop times is the measured inter-arrival time. Measuring the inter-arrival time can be accomplished by using a counter that starts upon receipt of the start timing packet 200B, and stops upon receipt of the stop timing packet 202B. The count value in the counter would then indicate the inter-arrival time.

In the example of FIG. 2, the calculated inter-arrival time (208) is 60.001 seconds (which represents the 1 minute difference in original transmission of the timing packets 200A, 202A by the time server 122, and the 0.001 second difference in network delays experienced by the timing packets 200B, 202B). However, the measured inter-arrival time (210) is 60.0011 seconds. The difference (time error) between the measured inter-arrival time and the calculated inter-arrival time is calculated (at 212), which in the example of FIG. 2 is 0.0001 second. Effectively, the difference between the measured inter-arrival time and the calculated inter-arrival time is due to an error of the client node clock device 160 to the primary clock device 127 (FIG. 1) in the time server 122 and also network traffic characteristics although the impact of the latter is mitigated by averaging in control block 214

A procedure to adjust the client clock device 160 using the time error value is then initiated (at 214). Intrinsic to the client clock adjustment procedure is averaging of the error signal to remove random packet delay variation.

Next, a frequency lock detect is performed (at 216) based on comparing the time error value to an error signal threshold. If the time error value is greater than or equal to the threshold, then frequency lock of the client clock device 160 is to be performed. On the other hand, if the time error value is less than the error signal threshold, then frequency lock does not have to be performed. In response to detecting that the time error value is greater than or equal to the error signal threshold, a client node clock control loop is performed (at 218) to perform adjustment of the frequency of the clock device 160 according to the time error value. This effectively adjusts the frequency of the clock device 160 to be the same as the primary clock device 127 of the time server 122 that is based on the reference source 124. In other words, the clock device 160 frequency is locked to the primary clock device 127 frequency. It should be noted that frequency lock can be achieved by other methods such as Synchronous Ethernet.

The above has described the process for performing clock synchronization of the clock device 160 of the client node 250. Another type of synchronization that can be performed is time synchronization, which is performed after the clock device 160 has been adjusted (locked to the frequency of time server primary clock device). The frequency lock of the clock device 160 at the client node 250 is indicated by setting a frequency lock flag in the client node clock control loop (218). If the frequency lock flag is set, then the timestamp of the next timing packet (received after timing packet 202B) is used to synchronize (at 220) the time of the client node 250. Basically, the timestamp and network delay of the next timing packet are used to set the initial time (time epoch) of the client node 250. The sum of the timestamp and the network delay of this next timing packet provides a time value that is used as the initial time (epoch). The time of day of the client node 250 is then subsequently incremented (at 222) using the client clock device 160.

The tasks 208, 210, 212, 214, 216, and 220 in FIG. 2 can be performed by the synchronization logic (162 in FIG. 1) of the client node 250.

Figure 3:
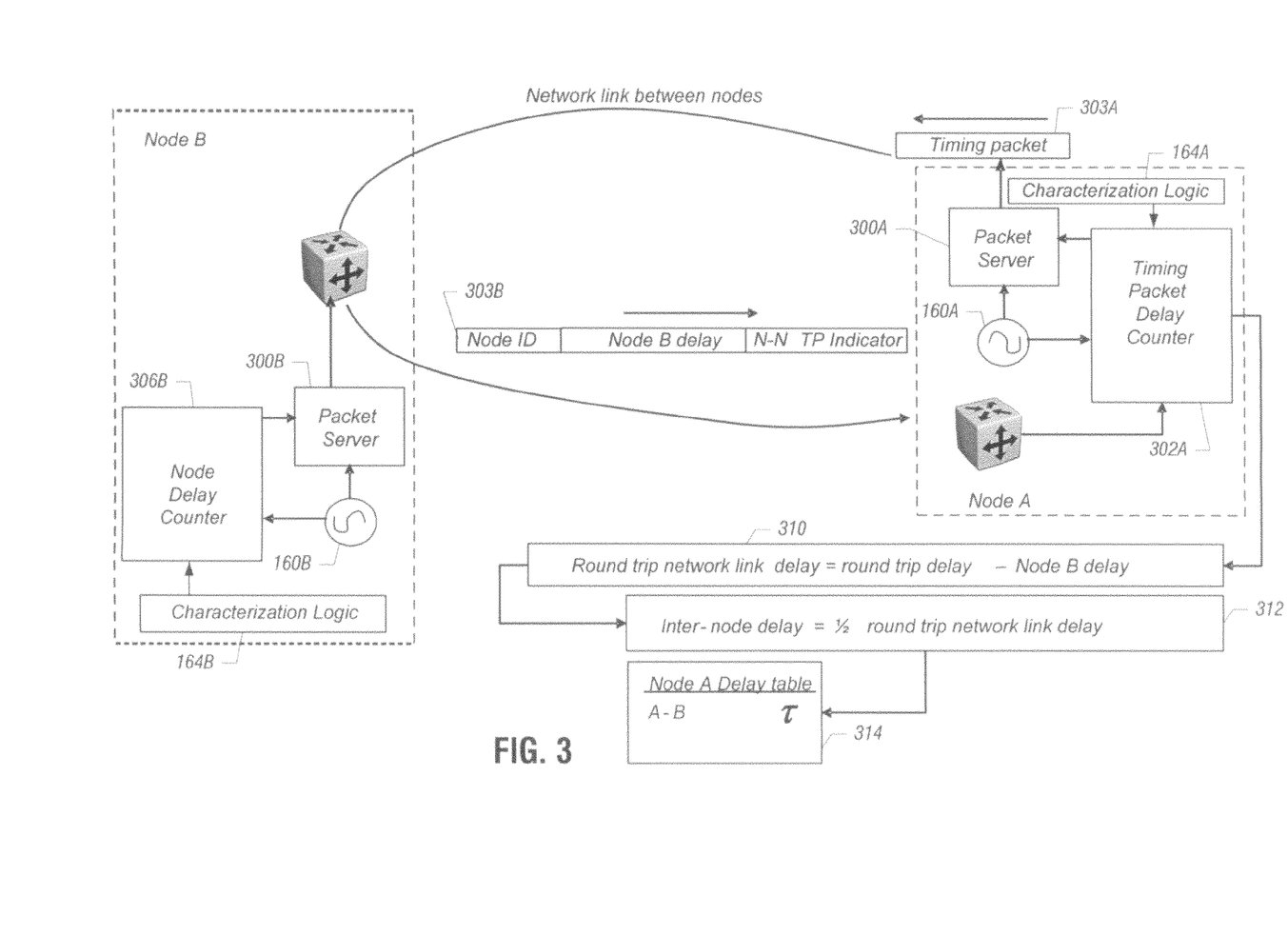
FIGS. 3 and 4 illustrate example flows of determining an inter-node delay, in accordance with some embodiments.

FIG. 3 illustrates an example flow of calculating an inter-node delay (between node A and node B). In other implementations, other techniques of calculating inter-node delays can be used.

The inter-node delay calculation is controlled by characterization logic 164 in each of the nodes A and B (164A in node A, and 164B in node B). The characterization logic 164A cooperates with a packet server 300A and a timing packet delay counter 302A in node A. Under control of the characterization logic 164A, the packet server 300A of node A is used to transmit a characterization timing packet 303A to node B. When the timing packet 303A is transmitted by the packet server 300A, the characterization logic 164A causes the timing packet delay counter 302A in node A to start.

The timing packet 303A is sent across the network link between nodes A and B, which is received by the characterization logic 164B of node B. Upon receipt of the timing packet 303A, the characterization logic 164B of node B starts a node delay counter 306B in node B. The node delay counter 306B is used to calculate the delay in propagating the characterization timing packet through node B. The delay counted by the node delay counter 306B is used to update the characterization timing packet received by node B, with the updated characterization timing packet referred to as 303B. The packet server 300B of node B sends the updated characterization timing packet (303B) back to node A. The updated characterization timing packet 303B contains a network delay field that contains the value of the delay through node B. The updated characterization timing packet 303B also contains a node ID field (which would contain the identifier of node B), as well as a node-to-node (N-N) TP Indicator field to indicate that the packet 303B is a timing packet. Although the characterization timing packet 303B is shown to have fields that differ slightly from the timing packet depicted in FIG. 2, it is noted that in some implementations, the characterization timing packet (as generated by a node during characterization) has the same format as a timing packet sent by the time server 122 (FIG. 2). However, in other implementations, the formats of the timing packet issued by the time server 122 and the packet servers of nodes can be different.

Upon receipt of the updated characterization timing packet 303B, the characterization logic 164A in node A causes the timing packet delay counter 302A to stop. The count of the timing packet delay counter 302A is converted into a time value that represents the roundtrip delay between nodes A and B, where the roundtrip delay includes the delay through node B. To obtain the true roundtrip network link delay (which does not include the delay through node B), the roundtrip network link delay is calculated (at 310) by subtracting the node B delay (contained in the node B delay field of timing packet 303B) from the roundtrip delay. The inter-node delay is then calculated (at 312) as being half the roundtrip network link delay. The node A delay table is then updated (at 314) using the inter-node delay calculated at 312.

Figure 4:
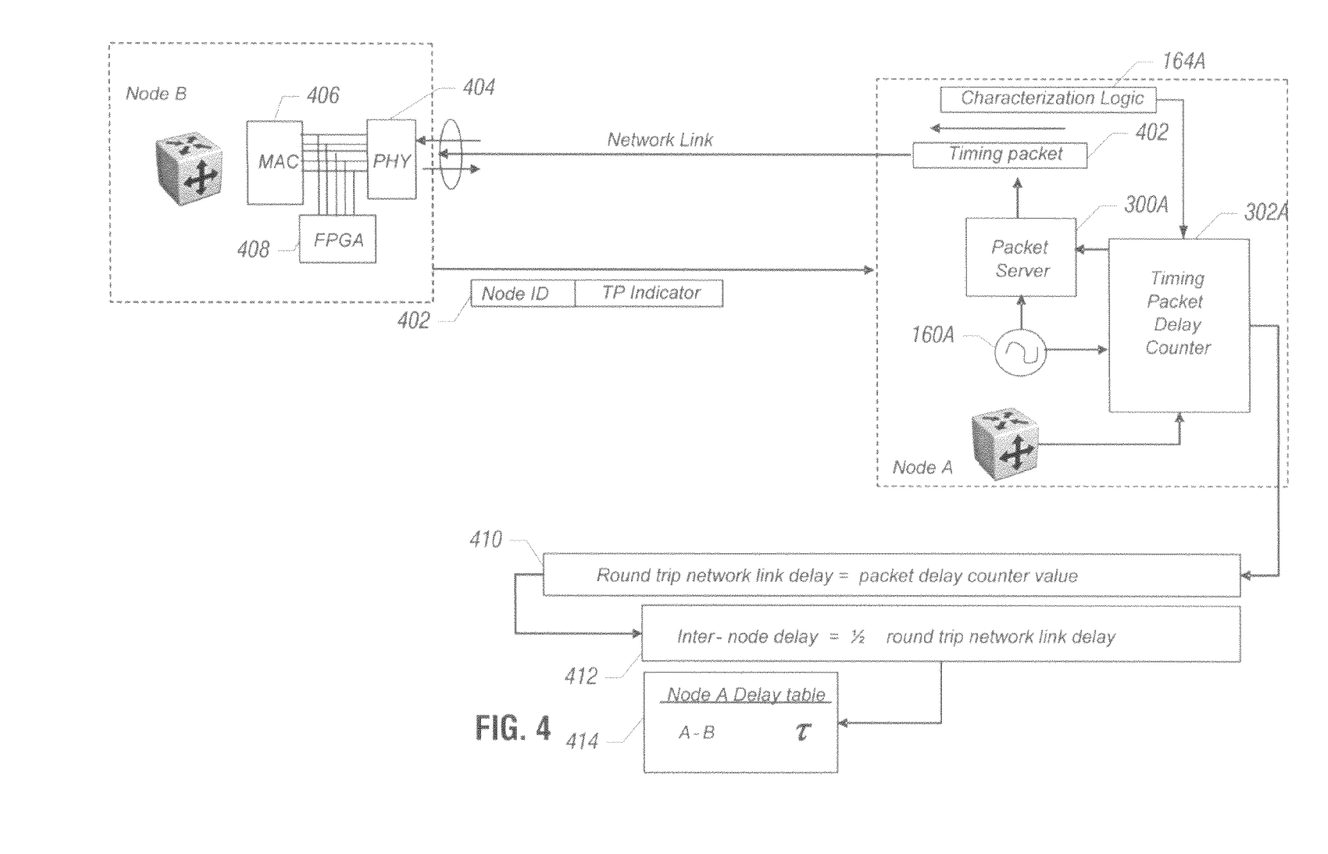

FIG. 4 shows an alternative technique of calculating the inter-node delay between nodes A and B. The technique of FIG. 4 is a packet mirror technique. Hardware in node B is able to "bounce" a characterization timing packet back to node A without having to buffer or queue the characterization timing packet. In such a technique, the processing performed at node B subjects the characterization timing packet to negligible node delay in node B. Thus, use of the node delay counter 306B as performed in FIG. 3 can be avoided.

As depicted in FIG. 4, the characterization logic 164A causes the packet server 300A of node A to transmit a characterization timing packet 402A. Upon transmission of the timing packet 402A, the timing packet delay counter 302A in node A is started. The timing packet 402A is transmitted across the network link between nodes A and B.

The characterization timing packet 402 is received by a physical layer 404 in node B. Above the physical layer 404 is a media access control (MAC) layer 406. Also in node B is a controller 408, which can be implemented with a field programmable gate array (FPGA) device or other device, that is able to recognize that the characterization timing packet 402 is a timing packet. Upon receipt of the characterization timing packet 402, controller 408 is able to reflect (or loop) the characterization timing packet 402 back to node A over the network link without queuing the timing packet 402. The amount of time that the characterization timing packet spends in node B is the time to read the TP indicator field of the timing packet (while the controller 408 processes the characterization timing packet).

Upon receipt of the characterization timing packet 402 from node B, the characterization logic 164A in node A causes the timing packet delay counter 302A to stop counting. The timing packet delay counter value corresponds to the roundtrip network link delay, which is set (at 410). The inter-node delay is then calculated (at 412) by dividing the roundtrip network link delay in half. The delay table of node A is then updated (at 414) with the inter-node delay.

Figure 5:
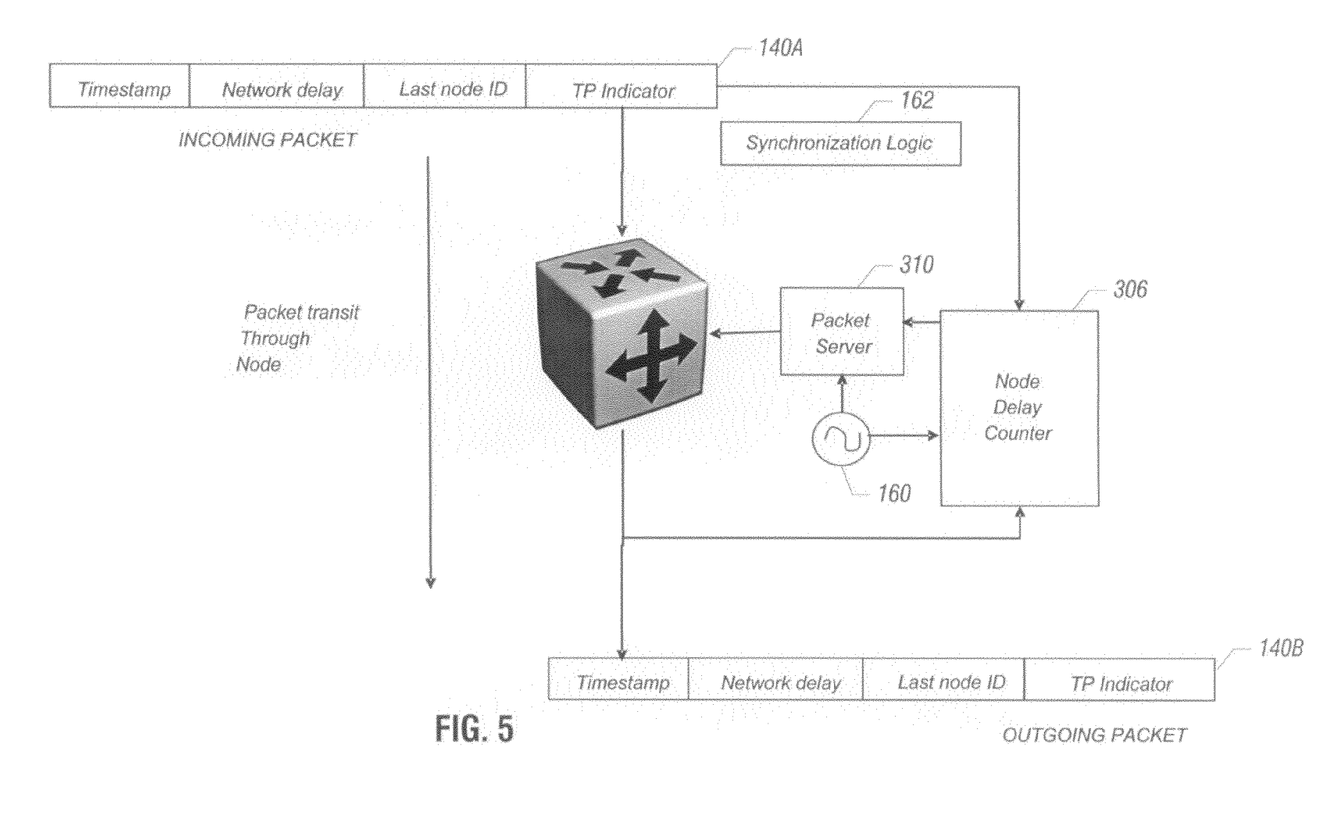
FIG. 5 illustrates an example flow for determining the delay through a node, in accordance with an embodiment.

FIG. 5 illustrates an example of how a node determines the delay associated with a timing packet traversing through the node. Note that the node delay is computed as a timing packet issued by the time server 122 (FIG. 2) makes its way through the node to a target client node. As depicted in FIG. 5, a timing packet 140A is received by a node. In response to receipt of the timing packet 140A, the synchronization logic 162 of the node starts the node delay counter 306. The node delay counter 306 is stopped when the timing packet is ready to be transmitted from the node. At that point, the synchronization logic 162 updates the network delay field of the timing packet 140A, and causes the packet server 310 to transmit the updated timing packet 140B to the next node.

As noted above, the various tasks performed by the synchronization logic 162 and characterization logic 164 are performed at the hardware level for enhanced processing speeds. However, in other implementations, the synchronization logic 162 and characterization logic 164 can be implemented in software on a processor.

Instructions of such software are executed on the processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving, at a first node in a network, a timing packet containing time information, the timing packet originated by a time server and including a field updated to reflect cumulative delays as the timing packet traverses the network;
   updating, by the first node, the time information in the timing packet to reflect a cumulative delay associated with communicating the timing packet to the first node over a network link to which the first node is connected;
   sending, by the first node, the timing packet with the updated time information to a second node to enable the second node to use the updated time information for synchronization of the second node;
   determining a delay experienced by the timing packet in transit through the first node and
   updating, by the first node, the time information in the timing packet to further reflect the delay associated with transit of the timing packet through the first node;
   wherein determining the delay experienced by the timing packet in transit through the first node is based on a counter that is clocked by a local clock device of the first node, wherein the local clock device of the first node has lower accuracy than a clock device associated with the time server.

2. The method of claim 1, wherein receiving the timing packet comprises receiving the timing packet from a third node connected to the network link, wherein the updated time information reflects the cumulative delay over the network link from the third node to the first node.

3. The method of claim 1, wherein updating the time information in the timing packet to reflect the cumulative delay comprises updating the time information to reflect a single hop delay over the network link.

4. The method of claim 1, wherein the network is part of a mobile communications system, and the second node is a base station, wherein sending the timing packet comprises sending the timing packet to the base station.

5. The method of claim 1, wherein sending the timing packet with the updated time information to the second node to enable the second node to use the updated time information for synchronization of the second node comprises sending the timing packet to the second node to enable the second node to perform synchronization of a clock device in the second node.

6. The method of claim 5, wherein synchronizing the clock device of the second node comprises locking a frequency of the clock device of the second node to a reference clock device frequency.

7. The method of claim 1, wherein sending the timing packet with the updated time information to the second node to enable the second node to use the updated time information for synchronization of the second node comprises sending the timing packet to the second node to enable the second node to synchronize a time of the second node to a reference time source associated with the time server.

8. The method of claim 7, further comprising using the updated time information to provide a time epoch in the second node.

9. The method of claim 1, wherein receiving the timing packet comprises receiving the timing packet containing a first field indicating a time at which the timing packet was originally transmitted from the time server associated with a reference time source, a second field indicating a cumulative delay experienced by the timing packet through the network, and a third field to indicate that the timing packet is a timing packet,
   wherein the time information includes the first and second fields.

10. The method of claim 1, further comprising:
    performing a characterization procedure in which the first node characterizes the cumulative delay associated with the network link that connects the first node to a third node.

11. The method of claim 10, further comprising:
    storing a delay table that specifies delays associated with multiple network links to which the first node is connected.

12. A network node comprising:
    characterization logic configured to characterize a cumulative delay associated with a network link between the network node and a second node;
    a storage configured to store a data structure that contains the cumulative delay associated with the network link;

synchronization logic configured to:
- receive a timing packet over the network link, the timing packet originated by a time server;
- update time information in the timing packet using the data structure; and
- transmit the timing packet containing the updated time information to a second node to enable the second node to perform synchronization; and
- a local clock device that has a lower accuracy than a primary clock device associated with the time server, wherein the time server is associated with a primary time reference source.

13. The network node of claim 12, wherein the synchronization logic is further configured to update the time information to refer to a cumulative delay associated with transit of the timing packet through the network node.

14. The network node of claim 12, wherein the characterization logic is further configured to update a delay table stored in the network node based on a characterization procedure that includes communication of a characterization timing packet with the second node.

15. A network node comprising:
- a clock device;
- synchronization logic configured to:
  - receive a timing packet originated by a time server associated with a reference time source, said timing packet including a field updated to reflect cumulative delays as the timing packet traverses a network to which said network node is connected;
  - use the timing packet to synchronize the clock device;
  - receive a further timing packet after the clock device has been synchronized; and
  - update a time in the network node according to the further timing packet;
  - wherein the clock device has lower accuracy than a primary clock device associated with the time server.

16. The network node of claim 15, wherein the received timing packet comprises a timestamp field to indicate a time at which the time server transmitted the timing packet, a network delay field to indicate a cumulative network delay experienced by the timing packet through a network, and an indicator field to indicate that the timing packet is related to timing.

* * * * *